United States Patent
Ersoy et al.

(10) Patent No.: US 6,644,634 B1
(45) Date of Patent: Nov. 11, 2003

(54) CONTROLLABLE ANTI-VIBRATION MOUNTING, NOTABLY FOR MOTOR VEHICLES

(75) Inventors: Metin Ersoy, Walluf (DE); Frank Meyerink, Lohne (DE)

(73) Assignee: ZF Lemförder Metallwaren AG, Lemförde (DE)

( * ) Notice: Subject to any disclaimer, the term of this patent is extended or adjusted under 35 U.S.C. 154(b) by 0 days.

(21) Appl. No.: 09/743,019

(22) PCT Filed: Apr. 26, 2000

(86) PCT No.: PCT/DE00/01294

§ 371 (c)(1),
(2), (4) Date: Feb. 13, 2002

(87) PCT Pub. No.: WO00/66911

PCT Pub. Date: Nov. 9, 2000

(30) Foreign Application Priority Data

Apr. 30, 1999 (DE) .................................. 199 19 876

(51) Int. Cl.[7] .................................................. F16F 9/53
(52) U.S. Cl. .................................................. 267/140.13
(58) Field of Search ..................... 267/140.11, 140.13; 188/266.1, 266.7, 267.1, 267.2

(56) References Cited

U.S. PATENT DOCUMENTS 4,923,057 A * 5/1990 Carlson et al. ............. 188/378
5,060,919 A * 10/1991 Takano et al. .......... 267/140.13

FOREIGN PATENT DOCUMENTS

| DE | 37 31 024 | 9/1987 |
| DE | 0 259 054 A2 | 3/1988 |
| DE | 0 312 719 | 8/1988 |
| DE | 41 22 360 | 7/1991 |
| DE | 196 17 839 | 5/1996 |

* cited by examiner

Primary Examiner—Christopher P. Schwartz
(74) Attorney, Agent, or Firm—McGlew and Tuttle, P.C.

(57) ABSTRACT

A controllable hydraulic bearing, especially for motor vehicles, with a working chamber and an equalizing chamber arranged annularly around the working chamber. The chambers are filled with an electrorheological fluid and are connected to one another via an annular gap-like overflow channel. The overflow channel has two mutually opposite electrodes for generating a high-voltage field in the overflow channel. The overflow channel (8) extends helically in its longitudinal extension around the said working chamber (1) between the working chamber (1) and the equalizing chamber. The wall of the overflow chamber (8) comprises an electrically insulating carrier layer provided on both sides with conductive cover layers forming electrodes.

20 Claims, 1 Drawing Sheet

CONTROLLABLE ANTI-VIBRATION MOUNTING, NOTABLY FOR MOTOR VEHICLES

FIELD OF THE INVENTION

The present invention pertains to a controllable hydraulic bearing for motor vehicles with a working chamber and an equalizing chamber arranged annularly around the working chamber, which are filled with an electrorheological fluid and are connected to one another via an annular gap-like overflow channel, wherein the overflow channel has two mutually opposite electrodes for generating a high-voltage field in the overflow channel.

BACKGROUND OF THE INVENTION

Such an engine bearing of this type has been known, e.g., from the documents DE 41 22 360 and DE 196 17 83. Controllable hydraulic bearings are used to obtain damping properties adapted to different operating conditions with a single hydraulic bearing. The fluid is usually moved to and fro between the working chamber and the equalizing chamber via the overflow channel located between the two chambers as a consequence of vibrations acting on the hydraulic bearing. The to-and-fro movement of the fluid has a vibration-damping effect especially at low frequencies and correspondingly high amplitudes. The location and the extent of the maximum possible damping (resonance frequency) is determined by the parameters channel length, channel cross section and fluid viscosity. Since both the channel length and the channel cross section are given in a prior-art hydraulic bearing, the frequency and the amplitude of the maximum damping can be changed only by changing the viscosity of the fluid used. Special substances, called electrorheological fluids, have been known for this purpose in the prior art, in which the application of an electric field causes a change in viscosity. The change in viscosity takes place here in proportion to the intensity of the electric field applied, the reaction of the fluid taking place in the millisecond range.

However, it was found in practice that the intensity of the electric fields necessary for a change in viscosity within the overflow channel provided with electrodes requires very high voltages because, on the one hand, a narrow gap is to be provided between the mutually opposite electrodes for a change in viscosity, but, on the other hand, a narrow gap leads to a low fluid throughput within the overflow channel, as a result of which the damping properties of the hydraulic bearing in question are in turn affected adversely as a consequence of the small amount of fluid. A relatively long overflow channel with a corresponding small gap, in which an annular gap electrode and a counterelectrode can build up a corresponding high-voltage field, is proposed in the design variant disclosed as a solution in DE 196 17 839. However, the fact that a great overall height of the hydraulic bearing must be accepted due to the length of the overflow channel is a major drawback of the solution disclosed.

SUMMARY AND OBJECTS OF THE INVENTION

The object of the present invention is therefore to further improve a hydraulic bearing of this type such that there is a corresponding small gap in the overflow channel and a sufficient length is available at the same time for providing the amount of fluid necessary for good damping properties, but the dimensions of the hydraulic bearing according to the present invention shall be at the same time compact, the design shall be simple to ensure a high level of reliability of operation, and manufacture shall be inexpensive.

According to the present invention, the overflow channel extends helically in its longitudinal extension (or as a spiral) around the working chamber between this working chamber and the equalizing chamber, and the wall of the channel consists of an electrically insulating carrier layer, which is provided with electrode-forming, conductive cover layers on both sides.

Due to the helical design of the overflow channel according to the present invention, an especially long channel can be obtained in a very small space, and the gap between the mutually opposite walls of the overflow channel can be selected at the same time to be particularly small. The helical winding of the channel walls additionally achieves the goal of the present invention that the electrically conductive cover layer applied to each side of the wall of the channel automatically generates an opposite charge of the mutually opposite channel walls at a positive or negative charge. Thus, an electric voltage field, which can lead to a variation in the viscosity of the fluid present in the overflow channel, can be generated in a very simple manner by applying a voltage to one cover layer.

It proved to be particularly expedient to design the carrier layer and the conductive cover layers as a one-part, flexible laminate strip. Such a flexible strip can be manufactured in a simple manner and can be handled without problems in terms of the manufacturing technology. An especially inexpensive design of the hydraulic bearing according to the present invention is obtained, furthermore, if each laminate strip forming the walls of the overflow channel is accommodated on its narrow side in an insulating plate, wherein a groove, which corresponds to the spiral shapes of the overflow channel and which is engaged by the respective upper and lower narrow sides of the laminate strip, is recessed in the insulating plates. The two insulating plates, e.g., ones made of a ceramic material, make unnecessary an additional insulation of the two cover layers located on the laminate strip after the installation; in addition, the flexible laminate strip is reliably fixed in the grooves recessed in the insulating plates.

The connection of the cover layers arranged on both sides of the carrier layer, which is necessary for the application of electric energy, is preferably embodied by an electric connection each arranged on the outside of the hydraulic bearing.

An exemplary embodiment of the subject of the present invention will be explained in greater detail below on the basis of the drawings attached.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
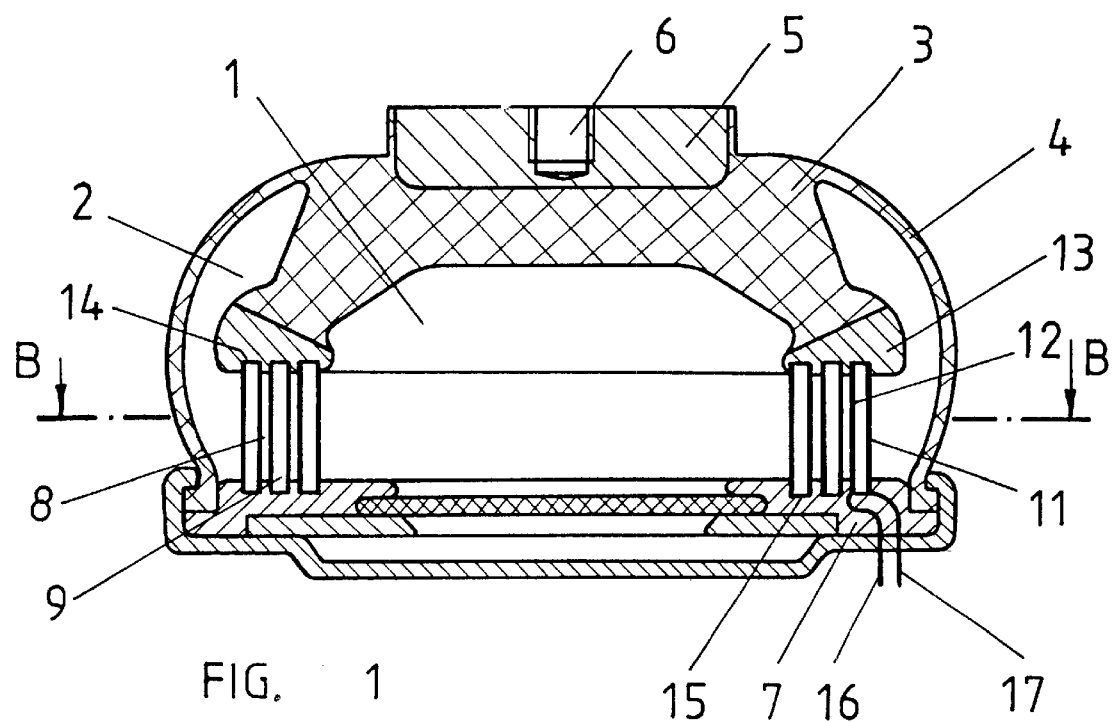
FIG. 1 is a sectional view through a controllable hydraulic bearing according to the present invention.

Referring to the drawings in particular, the exemplary embodiment shown is a controllable hydraulic bearing, especially for use as an engine bearing in motor vehicles, which has a working chamber 1 and an equalizing chamber 2 located concentrically on the outside coaxially around the working chamber 1. The chambers are filed with an electrorheological fluid. The upper closure of the working chamber 1 is formed by a rubber wall 3. The equalizing chamber 2 is closed toward the outside of the hydraulic bearing by an additional rubber diaphragm 4. Both rubber parts 3 and 4 are made in one piece and are adherently connected to an upper, centrally arranged carrier element 5, which can be fastened to the engine or to another part to be supported by means of the threaded hole 6 arranged in the carrier element 5. With its lower, free end facing away from the rubber wall 3, the rubber diaphragm 4 is fixed to a bottom plate 7, and the bottom plate 7 forms at the same time the lower closure of the working chamber 1.

Figure 2:
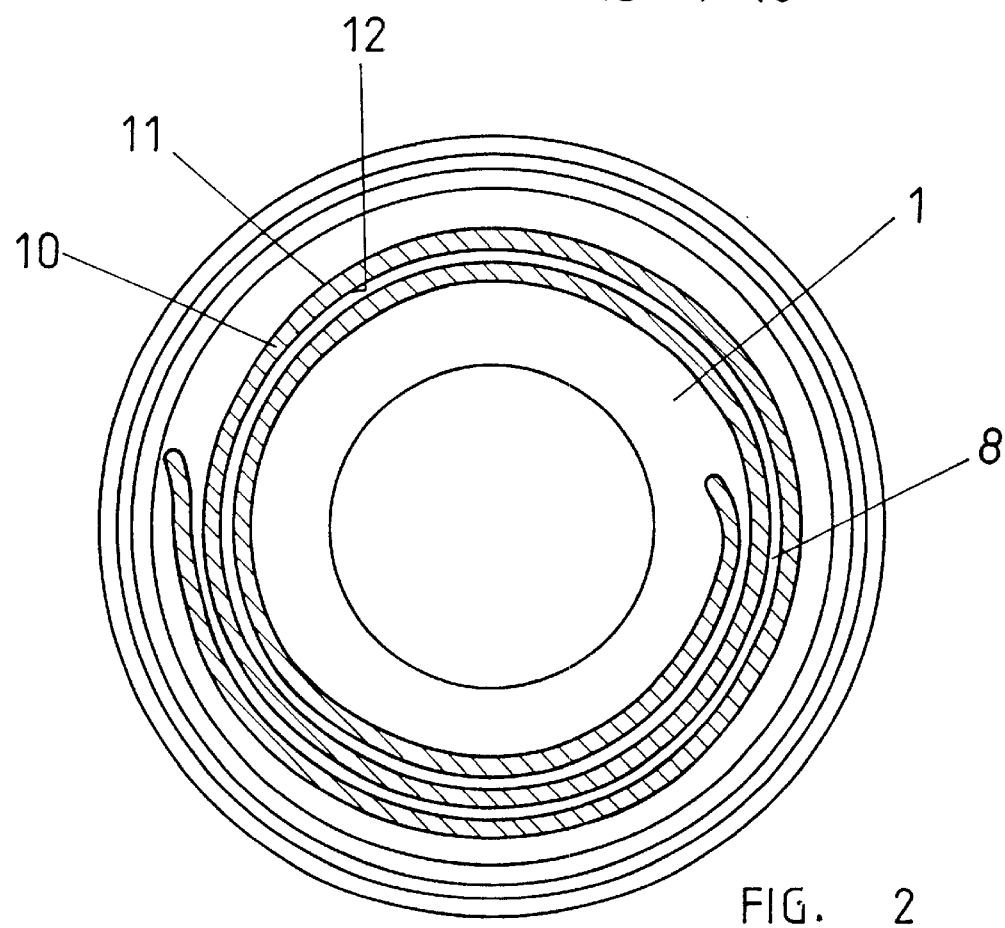
FIG. 2 is a horizontal section through the hydraulic bearing according to FIG. 1 in the area of the helical overflow channel along the section line B—B in FIG. 1.

Viewing FIGS. 1 and 2 together shows that, corresponding to the design according to the present invention, a ring-shaped overflow channel 8, whose wall is formed by a continuous, flexible laminate strip 9, the strip 9 making more than 1 spiral revolution. 2½ in the example illustrated, to form the channel 8 of the desired length, is arranged in an intermediate space between the upper rubber diaphragm 3 and the lower bottom plate 7. The spiral structure of the channel allows the length of the channel, when measured in the plane of the spiral of the laminate strip, to be greater than the aggregate overall circumference around the element formed by the flexible laminate strip 9. The element formed by the flexible laminate strip in turn provides a barrier between the working chamber 1 and the equalizing chamber 2, to separate a difference in pressure generated between the chambers as a result of viscous fluid flow through the overflow channel 8. The laminate strip 9 comprises a centrally arranged carrier layer 10 and two cover layers 11 and 12 arranged on the broad sides of the carrier layer 10. To accommodate the laminate strip 9 and to form the helical overflow channel, the bearing according to the present invention is provided between the rubber wall 3 and the laminate strip 9 with an insulating plate 13, in which a helical groove 14 had been prepared corresponding to the design of the helical channel for receiving the narrow side of the laminate strip. Like the bottom plate 7, the insulating plate 13 is preferably made of ceramic. Analogously to the above-described groove 14 in the insulating plate 13, a likewise helical groove 15, which is engaged by the lower narrow side of the laminate strip 9 in the assembled state, is recessed in the bottom plate 7. The arrangement of the overflow channel 8 between the insulating plate 13 and the bottom plate 7 forces the fluid to flow between the working chamber 1 and the equalizing chamber 2 in a region between the surfaces of the insulating plate 13 and the bottom plate 7, both of which are planner in a perpendicular orientation to the axis of the bearing and chambers. This arrangement guides the fluid without forcing an axial displacement of the fluid with respect to the bearing.

FIG. 1 also shows that the two cover layers 11 and 12 applied to the carrier layer 10 are connected to an electric contact 16 and 17 on the outside of the hydraulic bearing via an electric connection wire. If positive or negative voltage is applied to the corresponding electric contacts 16 and 17, the two cover layers 11 and 12 of the laminate strip receive opposite charges. A negative or positive charge of the mutually opposite channel walls is automatically obtained due to the laminate strip 9 being rolled up helically. An electric voltage field is thus built up, and a change in the voltage field leads to a change in the viscosity of the electrorheological fluid due to the special properties of the this fluid. The helical design makes it possible, for the first time ever, to prepare a correspondingly long overflow channel at an especially small gap within the channel of 0.5 mm to 2.0 mm and preferably 1 mm and to provide at the same time an electric voltage field over the entire length of the channel. Such a design generally incorporating a dimension of the channel along a width of the carrier layer that is at least 3 times the gap provides for the necessary compact size of the envelope of the overall channel forming element, thus maintaining compact overall bearing dimensions. The figures show clearly that the overall size of the hydraulic bearing according to the present invention corresponds to that of prior-art hydraulic bearings used hitherto.

Due to the special design and the very small size of the channel, the additional advantage arises that the high voltages needed for other bearings of this class are not necessary in this bearing according to the present invention. However, a sufficient amount of fluid is present at the same time within the overflow channel 8 in order not to adversely affect the damping properties of the bearing as a whole. The flexible strip material necessary for the channel wall can be manufactured in a simple manner and can be introduced without problems into the corresponding grooves 14 and 15 of the insulating plate 13 and the bottom plate 7, respectively.

There are no movable parts in the assembled state of the bearing according to the present invention, so that a possible noise generation is ruled out.

While specific embodiments of the invention have been shown and described in detail to illustrate the application of the principles of the invention, it will be understood that the invention may be embodied otherwise without departing from such principles.

What is claimed is:

1. A controllable hydraulic bearing, comprising:
   a working chamber;
   an equalizing chamber arranged annularly around said working chamber, said working chamber and said equalizing chamber being filled with an electrorheological fluid;
   an annular gap-like overflow channel connecting said working chamber to said equalizing chamber, said overflow channel being located between said working chamber and said equalizing chamber and channeling said fluid between said working chamber and said equalizing chamber;
   two mutually opposite electrodes associated with said overflow channel, said two mutually opposite electrodes for generating a high-voltage field in the overflow channel, the said overflow channel extending helically in a longitudinal extension around said working chamber between said working chamber and said equalizing chamber, a wall of said overflow channel comprising an electrically insulating carrier layer provided on both sides with conductive cover layers to form said electrodes.

2. A controllable hydraulic bearing in accordance with claim 1, wherein said carrier layer and said conductive cover layers of said element form a flexible laminate strip.

3. A controllable hydraulic bearing in accordance with claim 2, wherein said laminate strip, forming the walls of said overflow channel, is accommodated on each narrow side in an insulating plate, wherein grooves corresponding to the helical shape of said overflow channel and which are engaged by respective upper and lower narrow sides of the laminate strip are recessed in said insulating plates.

4. A controllable hydraulic bearing in accordance with claim 1, wherein a distance between mutually opposite conductive cover layers of said overflow channel in an area of the helices of the channel is between 0.5 mm and 2.0 mm.

5. A controllable hydraulic bearing in accordance with claim 4, wherein said distance between mutually opposite conductive cover layers of said overflow channel in an area of the helices is substantially equal to 1 mm.

6. A controllable hydraulic bearing in accordance with claim 1, wherein said cover layers are arranged on both sides of said carrier layer and are provided with an electric connection each arranged on the outside of the hydraulic bearing.

7. A controllable hydraulic bearing, comprising:
  a housing defining a working chamber space and an equalizing chamber space disposed annularly around said working chamber space;
  a spiral wrapped element disposed in said housing between said working chamber space and said equalizing chamber space, said spiral wrapped element being fully closed in axial directions of the bearing and cooperating with said housing to delimit said equalizing chamber space to form the equalizing chamber and disposed annularly around said working chamber space to form the working chamber, said working chamber and said equalizing chamber being filled with an electrorheological fluid, said spiral wrapped element forming an overflow channel extending in spiral, with a longitudinal extension, between said working chamber and said equalizing chamber, said element comprising an electrically insulating carrier layer provided on both sides with conductive cover layers to form electrodes; and
  two mutually opposite electrodes associated with said overflow channel, said two mutually opposite electrodes for generating a high-voltage field in the overflow channel.

8. A controllable hydraulic bearing in accordance with claim 7, wherein said carrier layer and said conductive cover layers form a flexible laminate strip.

9. A controllable hydraulic bearing in accordance with claim 8, wherein said cover layers are arranged on both sides of said carrier layer and are provided with an electric connection each arranged on the outside of the hydraulic bearing.

10. A controllable hydraulic bearing in accordance with claim 9, wherein a distance between mutually opposite conductive cover layers of said overflow channel in an area of the helices of the channel is between 0.5 mm and 2.0 mm.

11. A controllable hydraulic bearing in accordance with claim 10, wherein said distance between mutually opposite conductive cover layers of said overflow channel in an area of the helices is substantially equal to 1 mm.

12. A controllable hydraulic bearing in accordance with claim 9, wherein said laminate strip, forming the walls of said overflow channel, is accommodated on each narrow side in an insulating plate, wherein grooves corresponding to the helical shape of said overflow channel and which are engaged by respective upper and lower narrow sides of the laminate strip are recessed in said insulating plates.

13. A controllable hydraulic bearing, comprising:
  a housing containing an electrorheological fluid, said housing having a working chamber for said electrorheological fluid, said working chamber being partially defined by a elastomer wall and an insulating plate attached to said elastomer wall and partially defined by a bottom plate, and said housing having an equalizing chamber for said electrorheological fluid located partially surrounding said working chamber, said equalizing chamber being partially defined by a diaphragm;
  a spiral element formed of a tape shaped carrier layer spiraling for more than 1 spiral revolution along a length of said tape shaped carrier layer, said carrier layer spiral having a gap between successive layers of said spiral, said gap along with said insulating plate and said bottom plate forming a channel, said channel being fully closed in axial directions of the bearing, and receiving said electrorheological fluid for providing fluid connection between a radially interior region of said spiral element partially defining said working chamber and a radially exterior region of said spiral element partially defining said equalizing chamber, edges of said tape shaped carrier layer of said spiral element engaging spiral grooves in both said insulating plate and said bottom plate; and
  two electrodes disposed on opposite faces of said tape shaped carrier layer of said spiral element, said two electrodes being electrically insulated from each other by said carrier layer, said two electrodes at least partially forming opposing surfaces of said channel, each of said two electrodes having electrical contacts for making electrical connections to said electrodes, said electrodes providing an electrical potential across said channel when oppositely electrically charged, said electrical potential across said channel acting on said electrorheological fluid in said channel to effect a viscosity of said electrorheological fluid flowable between said working and said equalizing chambers.

14. A controllable hydraulic bearing in accordance with claim 13, wherein a volume of said working chamber is completely enveloped within outer bounds of said equalizing chamber.

15. A controllable hydraulic bearing, in accordance with claim 13, wherein fluid flow between said working and said equalizing chambers is possible through said spiral element in a region defined by two parallel planes perpendicular to an axis of said working chamber, and said fluid is not directed with an axial displacement with respect to said axis of said chamber.

16. A controllable hydraulic bearing in accordance with claim 13, wherein said working chamber elastomer wall and said equalizing chamber diaphragm are formed integral of the same piece of material.

17. A controllable hydraulic bearing in accordance with claim 13, wherein said spiral element provides a fluid barrier, directly between a volume of said working chamber and a volume of said equalizing chamber, for a difference in fluid pressure of said working and said equalizing chambers resulting from viscus fluid flow of said electrorheological fluid through said channel.

18. A controllable hydraulic bearing in accordance with claim 13, wherein a distance between said electrodes providing an electrical potential across said channel is between 0.5 mm and 2.0 mm.

19. A controllable hydraulic bearing in accordance with claim 13, wherein a length of said channel is greater than an aggregate circumference around said spiral element in a plane of said spiral element.

20. A controllable hydraulic bearing in accordance with claim 13, wherein a dimension of said channel along a width of said tape shaped carrier layer is greater than 3 times a distance between said two electrodes forming said opposing surfaces of said channel.

* * * * *